(12) United States Patent
Choi et al.

(10) Patent No.: US 8,174,464 B2
(45) Date of Patent: *May 8, 2012

(54) TWO-DIMENSIONAL AND THREE-DIMENSIONAL IMAGE SELECTABLE DISPLAY DEVICE

(75) Inventors: Kyung Ho Choi, Ulsan (KR); Brent Jang, Ulsan (KR); Hui Nam, Ulsan (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 885 days.

This patent is subject to a terminal disclaimer.

(21) Appl. No.: 11/545,978

(22) Filed: Oct. 10, 2006

(65) Prior Publication Data

US 2007/0126967 A1 Jun. 7, 2007

(30) Foreign Application Priority Data

Dec. 2, 2005 (KR) .......................... 10-2005-0117177

(51) Int. Cl.
*G09G 5/00* (2006.01)
*G09G 3/36* (2006.01)
*G02F 1/1343* (2006.01)

(52) U.S. Cl. .................... 345/6; 345/5; 345/87; 349/141

(58) Field of Classification Search ................ 345/5–6, 345/87; 349/123, 127–128, 141, 143, 41, 349/187

See application file for complete search history.

(56) References Cited

U.S. PATENT DOCUMENTS

| | | | | |
|---|---|---|---|---|
| 6,005,650 A | * | 12/1999 | Kim et al. | 349/130 |
| 6,084,647 A | * | 7/2000 | Hatano et al. | 349/15 |
| 6,111,626 A | * | 8/2000 | Watanabe et al. | 349/141 |
| 6,285,428 B1 | * | 9/2001 | Kim et al. | 349/141 |
| 6,700,558 B1 | * | 3/2004 | Itoh | 345/87 |
| 6,970,290 B1 | * | 11/2005 | Mashitani et al. | 359/462 |
| 6,999,155 B2 | * | 2/2006 | Tillin et al. | 349/193 |
| 7,557,871 B2 | * | 7/2009 | Matsumoto et al. | 349/15 |

(Continued)

FOREIGN PATENT DOCUMENTS

CN 1705903 A 12/2005

(Continued)

OTHER PUBLICATIONS

Korean Patent Abstracts for Publication No. 1020000009532 A; dated Feb. 15, 2000 in the name of Sang Yong Han, et al.

(Continued)

*Primary Examiner* — Bipin Shalwala
*Assistant Examiner* — Matthew Fry
(74) *Attorney, Agent, or Firm* — Christie, Parker & Hale, LLP

(57) ABSTRACT

A display device, adapted to display a two-dimensional image or a three-dimensional image, includes an image panel for displaying an image and a barrier panel located in front of the image panel. The barrier panel includes a first substrate including In-Plane-Switching type electrodes arranged on a surface of the substrate, a second substrate having a transparent electrode on the inner side surface, and a liquid crystal layer located between the first and second substrates. The barrier panel displays the image as a two-dimensional image or a three-dimensional image depending on electric fields established between first and second substrates of the barrier panel and between the In-Plane-Switching type electrodes formed on the first substrate. The two-dimensional image may be displayed with wide viewing angle and narrow viewing angle options.

14 Claims, 6 Drawing Sheets

U.S. PATENT DOCUMENTS

| | | | |
|---|---|---|---|
| 7,602,466 B2 * | 10/2009 | Kang | 349/141 |
| 7,855,756 B2 * | 12/2010 | Hong et al. | 349/15 |
| 2002/0191128 A1 * | 12/2002 | Okumura et al. | 349/96 |
| 2003/0063186 A1 | 4/2003 | Tomono | |
| 2003/0067563 A1 * | 4/2003 | Tomono | 349/15 |
| 2004/0222945 A1 * | 11/2004 | Taira et al. | 345/6 |
| 2005/0179847 A1 * | 8/2005 | Miyachi et al. | 349/141 |
| 2005/0190320 A1 | 9/2005 | Yang | |
| 2005/0286000 A1 * | 12/2005 | Tsai et al. | |
| 2006/0098281 A1 * | 5/2006 | Fukushima et al. | 359/464 |
| 2006/0145979 A1 * | 7/2006 | Lee et al. | 345/88 |
| 2006/0146250 A1 * | 7/2006 | Wu et al. | 349/141 |
| 2006/0215262 A1 * | 9/2006 | Kim | 359/465 |
| 2007/0030543 A1 | 2/2007 | Javidi et al. | |
| 2007/0058258 A1 | 3/2007 | Mather et al. | |
| 2007/0085957 A1 * | 4/2007 | Jin et al. | 349/141 |
| 2007/0159566 A1 | 7/2007 | Kang | |
| 2008/0007566 A1 * | 1/2008 | Park et al. | 345/606 |
| 2008/0169997 A1 * | 7/2008 | Choi | 345/6 |
| 2008/0218459 A1 * | 9/2008 | Kim et al. | 345/87 |
| 2009/0067156 A1 * | 3/2009 | Bonnett et al. | 362/97.2 |
| 2009/0251657 A1 * | 10/2009 | Kang | 349/187 |

FOREIGN PATENT DOCUMENTS

| | | |
|---|---|---|
| JP | 2003-140108 | 5/2003 |
| JP | 2005-134663 | 5/2005 |
| JP | 2005-258013 | 9/2005 |
| KR | 2000-0009532 | 2/2000 |
| KR | 10-2003-0022583 | 3/2003 |
| KR | 10-2005-0062615 | 6/2005 |
| KR | 10-2005-0064721 | 6/2005 |
| KR | 2005-0071513 | 7/2005 |
| KR | 10-2006-0030152 | 4/2006 |
| KR | 10-2006-0076986 | 7/2006 |
| KR | 10-2006-0124849 | 12/2006 |
| WO | WO 2004036287 A1 * | 4/2004 |
| WO | WO 2005/011293 A1 | 2/2005 |

OTHER PUBLICATIONS

Patent Abstracts of Japan for Publication No. 2005-258013; dated Sep. 22, 2005 in the name of Tomoo Takatani, et al.

Chinese Office Action issued on Feb. 1, 2008 in corresponding Chinese Application No. 200610169344.0, indicating relevance of listed references in this IDS.

Japanese Office action dated Feb. 3, 2009, for corresponding Japanese application 2006-102037, noting listed reference in this IDS.

Corresponds to U.S. Publication 2006/0098281 and International Publication WO 2004/036287, both previously cited in U.S. Office action dated Sep. 9, 2009.

Chinese Patent Gazette dated Sep. 8, 2010 with partial English translation, noting listed reference in this IDS, as well as U.S. Patent 6,005,650, previously cited in U.S. Office action dated Sep. 9, 2009.

U.S. Office action dated Feb. 23, 2011, for cross-reference U.S. Appl. No. 12/007,886.

U.S. Office action dated Feb. 23, 2011, for cross-reference U.S. Appl. No. 12/007,886.

* cited by examiner

Narrow View 2D

TWO-DIMENSIONAL AND THREE-DIMENSIONAL IMAGE SELECTABLE DISPLAY DEVICE

CROSS-REFERENCE TO RELATED APPLICATIONS

This application claims priority to and the benefit of Korean Patent Application No. 10-2005-0117177, filed on Dec. 2, 2005, in the Korean Intellectual Property Office, the entire content of which is incorporated herein by reference.

BACKGROUND

1. Field of the Invention

The present invention relates to a display device, and more particularly, to a two-dimensional and three-dimensional image selectable display device which can display a two-dimensional image or a three-dimensional image by user's selection.

2. Discussion of Related Art

Autostereoscopic three-dimensional image display method is classified into a parallax method, a lenticular method, and an integral photography method. The parallax method enables the image to be divided and viewed through an aperture of a longitudinal lattice in front of each image corresponding to the left and right eyes. The lenticular method uses a lenticular plate arranged with a semi-cylindrical lens. The integral photography method uses a lens plate of the fly's eye shape.

A three-dimensional image display method employing special glasses has an advantage in that many observers can enjoy a three-dimensional image, but has a disadvantage in that it requires the observers to wear the special glasses, thus causing the inconvenience. The special glasses may be a pair of polarization glasses or liquid crystal shutter glasses.

The autostereoscopic three-dimensional image display method has a fixed observation region and thus only a limited number of viewers can enjoy the three-dimensional image. This method, however, may be preferred because it does not require separate glasses. As a result, extensive research is in progress in the area of autostereoscopic three-dimensional image display because in this area, the observer may directly view the screen.

The holographic display method is suggested as an example of displaying a perfect three-dimensional stereo image, which directly displays an image in a three-dimensional coordinate system in space usually through using laser, lens, mirror, etc. The holographic display method can provide three-dimensional stereo image having focus adjustment, vergence angle, binocular disparity, motion parallax, etc., which are factors causing the three-dimensional effect. The holographic display method is classified into a laser light reproduction hologram method and a white-colored light reproduction hologram. Hence, using the holographic display method, it is possible to have the same perception of reality as having the actual object before the viewer, but the holographic method is difficult to implement and the space occupied by the equipment is large.

Therefore, the tendency for employing parallax barrier is on the rise. The parallax barrier is a method of virtually implementing the three-dimensional image through an optical illusion using the stereo image.

The parallax barrier method places a longitudinal or transverse type (slit) in front of the image corresponding to the left/right eyes and causes the stereo image synthesized through the slit to be separated and viewed to perceive the three-dimensional effect.

The three-dimensional image display device by the parallax barrier method will be briefly described below.

FIG. 1 shows a three-dimensional image being formed by a conventional barrier method three-dimensional display device.

Referring to FIG. 1, a barrier panel 20 including slits, through which the light from an image panel 30 penetrates, and a barrier, which screens the light, are arranged in front of the image panel 30.

An observer 10 views images displayed or printed on the image panel 30 through the slits of the barrier panel 20. The left eye L and the right eye R of the observer 10 view different regions of the image panel 30 even when the image panel is viewed through the same slit. The parallax barrier method utilizes the above principle, which enables the observer to perceive the three-dimensional effect because the left and right eyes view different regions of the image through the same slit.

That is, the left eye L views the pixel Lp corresponding to the left eye on the image panel 30, and the right eye R views the pixel Rp corresponding to the right eye on the image panel 30 in FIG. 1.

However, using the conventional parallax barrier method three-dimensional display device it is very difficult to view a two-dimensional image as long as the barrier panel 20 is installed and provided in front of the image panel 30. Therefore, in the conventional parallax barrier method three-dimensional display device, the barrier panel should be eliminated to view a two-dimensional image.

SUMMARY OF THE INVENTION

Embodiments of the present invention provide a two-dimensional and three-dimensional image selectable display device. The display device includes a barrier panel having liquid crystals formed in the barrier panel that are initially directed and arranged in Electrically Controlled Birefringence (ECB) mode. A lower plate of the barrier panel is arranged with In-Plane-Switching (IPS) type electrodes. A transparent electrode is formed over an inner side surface of front plate or a front substrate of the barrier panel. It is possible to switch from a wide viewing angle display to a narrow viewing angle display in a two-dimensional display mode. It is also possible to switch from two-dimensional display to three-dimensional display by user's selection.

A display device according to an embodiment of the present invention includes an image panel for displaying an image and a barrier panel located in front of the image panel. The barrier panel displays the image as a two-dimensional image or a three-dimensional image. The barrier panel includes a first substrate arranged with IPS type electrodes, a second substrate having a transparent electrode formed on an inner side surface of the second substrate, and a liquid crystal layer formed on the first and second substrates. The inner side of each substrate of the barrier panel faces the other substrate.

In addition, a first orientation film and a second orientation film are provided on inner side surfaces of the first and second substrates, respectively. The first and second orientation films are anti-parallel rubbed, so that the liquid crystal is initially directed and arranged in the ECB mode.

In addition, the IPS type electrodes include a first electrode unit and a second electrode unit having a plurality of extrusions. The extrusions of each electrode unit are arranged alternately with the extrusions of the other electrode unit.

In addition, the image panel may be configured as a liquid crystal display (LCD), a plasma display panel (PDP), or an organic light-emitting device (OLED). The image panel selectively displays a two-dimensional image or a three-dimensional image. When the image panel displays a three-dimensional image, a left eye pixel displaying an image for a left eye, and a right eye pixel displaying an image for a right eye are alternately arranged.

In addition, the barrier panel may selectively form a two-dimensional or a three-dimensional image depending on whether a voltage is applied to the IPS type electrodes provided on the first substrate and an electric field is generated along a direction substantially parallel to the first substrate in a predetermined region.

In addition, the barrier panel may selectively implement a wide viewing angle or a narrow viewing angle when displaying a two-dimensional image depending on whether a voltage is applied to the electrodes provided on the first substrate and the second substrate and whether an electric field is generated between the first and second substrates.

BRIEF DESCRIPTION OF THE DRAWINGS

These and/or other aspects and features of the invention will become apparent and more readily appreciated from the following description of the exemplary embodiments, taken in conjunction with the accompanying drawings that are listed below.

DETAILED DESCRIPTION

Exemplary embodiments of the present invention will be described in a more detailed manner with reference to the accompanying drawings.

Figure 1:
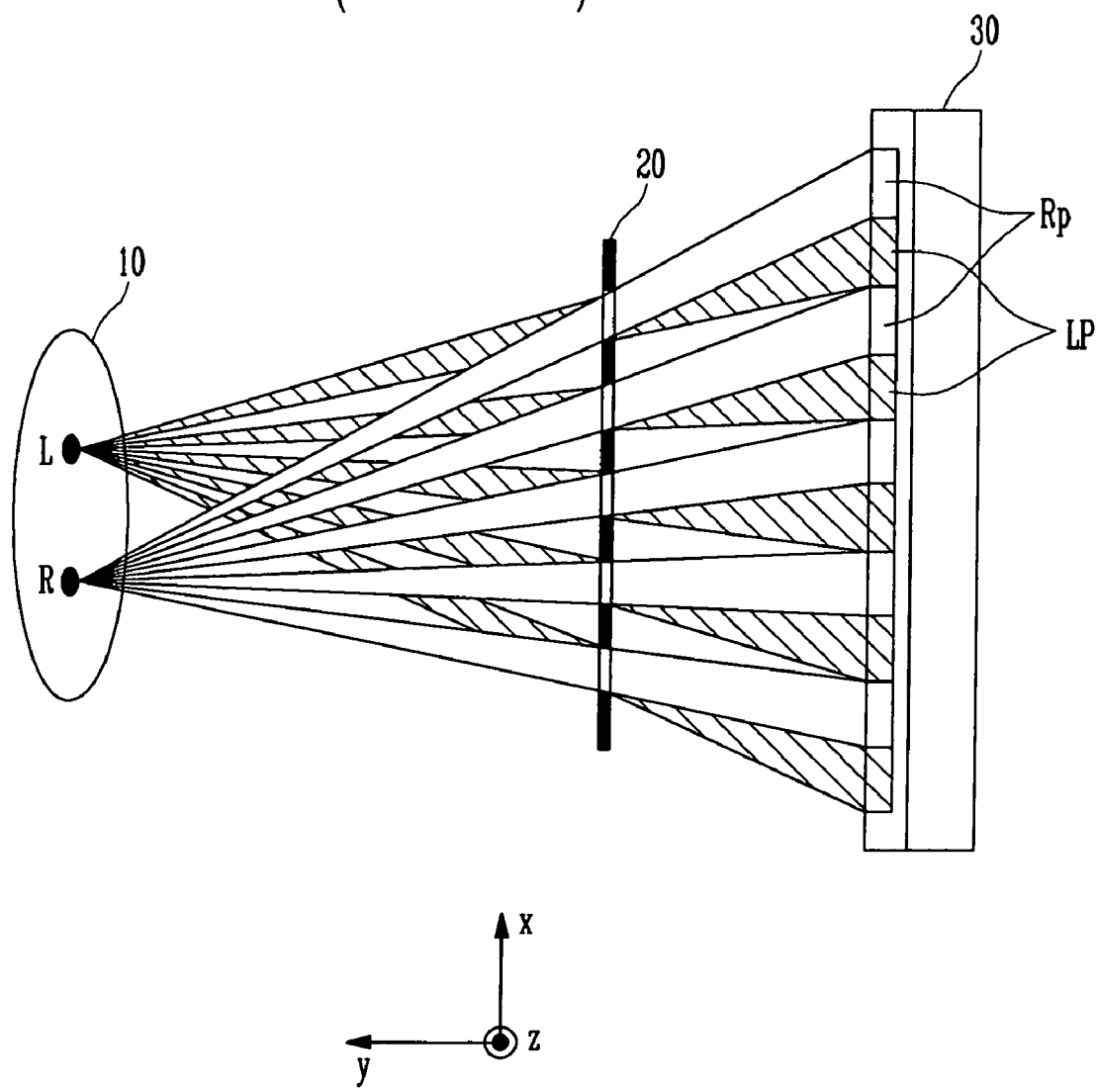
FIG. 1 shows formation of a three-dimensional image by a conventional barrier method three-dimensional display device.
Figure 2:
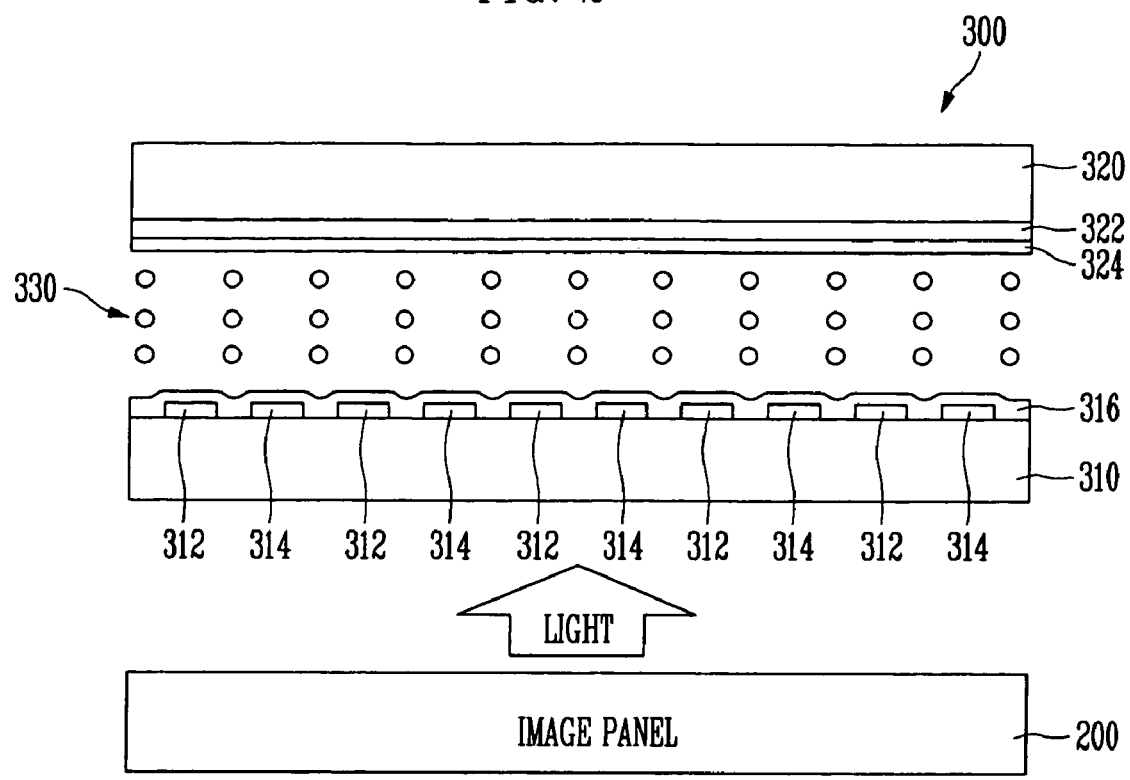
FIG. 2 is a schematic sectional view of a display device according to an embodiment of the present invention.

FIG. 2 is a schematic sectional view of a display device according to an embodiment of the present invention.

The display device of the present invention includes an image panel 200 and a barrier panel 300.

The image panel 200 can be configured as a liquid crystal display device (LCD), a plasma display panel (PDP), an organic light-emitting device (OLED) or the like. The embodiments of the present invention will be described with reference to an LCD device as an exemplary configuration of the image panel 200.

The barrier panel 300 includes a first substrate 310, a second substrate 320, and a liquid crystal layer 330 formed between the first and second substrates 310, 320. Liquid crystals in the liquid crystal layer 330 are initially directed and arranged in an Electrically Controlled Birefringence (ECB) mode. In-Plane-Switching (IPS) type electrodes 312, 314 are arranged on a surface of the first substrate 310. A transparent electrode 322 is formed on an inner side surface of the second substrate 320 facing the first substrate 310. Therefore, the barrier panel 300 is configured to be capable of switching between two-dimensional and three-dimensional display modes. In the two-dimensional display mode, the barrier panel 300 is particularly capable of switching between a wide viewing angle and a narrow viewing angle.

A first orientation film 316 and a second orientation film 324 are respectively formed on inner side surfaces of the first and second substrates 310, 320. The inner side of the first or second substrates 310, 320 is the side facing the other substrate. The first and second orientation films 316, 324 are anti-parallel rubbed and as a result the liquid crystals within the liquid crystal layer 330 are initially directed and arranged in the ECB mode.

The image panel 200 can selectively display two-dimensional or three-dimensional images. When the image panel 200 is used to display a three-dimensional image, a left eye pixel L, displaying the image information for the left eye, and a right eye pixel R, displaying the image information for the right eye, are alternately formed.

In addition, the barrier panel 300, which is located between the image panel 200 and an observer (not shown), serves to pass or screen the light from the image panel 200. When displaying a two-dimensional image, the barrier panel 300 is operated to pass the image from the image panel 200 to the observer. When displaying a three-dimensional image, the barrier panel 300 is operated to cause the observer to see a virtual three-dimensional stereo image formed through slits and barriers of the barrier panel 300.

The slits are for passing and the barriers are for screening (or blocking) the light from the right eye pixels R and the left eye pixels L of the image panel 200. The barrier panel 300 is configured to alternately form the slits and barriers when operating in the three-dimensional mode.

The barrier panel 300 can form a three-dimensional image by making it possible to acquire the effect of slits and barriers for passing and screening light, that are arranged at predetermined intervals, by applying an electric field between the IPS type electrodes 312, 314 arranged on the first substrate 310. The electric field between the IPS electrodes 312, 314 would form in a direction substantially parallel to the first substrate 310.

Three-dimensional image formation method by the display device of the embodiments of the invention will be described in more detail. First, the light directed to the left eye of the observer from the left eye pixel L passes through the slit of the barrier panel and reaches the left eye of observer. However, the light from the left eye pixel L of the image panel 200 directed to the right eye of the observer is screened by the barrier panel 300 and cannot reach the observer.

In this method, the light from the right eye pixel R of the image panel 200 passes through the slit of barrier panel 300 and reaches the right eye of the observer, whereas the light directed to the left eye of observer from the same right eye pixel R is screened by the barrier panel 300.

Accordingly, the light from the left eye pixel L is transmitted to only the left eye of observer, and the light from the right eye pixel R is transmitted to only the right eye of observer. As a result, a sufficient disparity of information is generated between the light reaching the left eye and light reaching the right eye so that an observer, i.e., a human being, can perceive a three-dimensional image.

In addition, the barrier panel 300 operates in two modes in the case of implementing the two-dimensional image. Unless a predetermined electric field is generated between electrodes provided on the first and second substrates 310, 320 of the barrier panel 300, a penetration axis of a polarization plate (not shown) provided on the image panel 200 is aligned with a longitudinal axis of the array of the liquid crystals within the liquid crystal layer 330 formed in the barrier panel 300. Thus, making it possible to implement a wide viewing angle for the two-dimensional image.

However, a predetermined electric field may be formed between the electrodes provided on the first and second substrates 310, 320 of the barrier panel 300. The predetermined electric field generated between the first and second substrates would be substantially perpendicular to the substrates (along a y-axis direction of FIG. 2). If the predetermined electric field is formed between the first and second substrates 310, 320, the array of liquid crystals within the liquid crystal layer 330 is tilted toward a direction substantially perpendicular to the first and second substrates by a predetermined angle. Thus an average slope of the liquid crystals in the inclination direction becomes substantially 45 degrees about the penetration axis of the polarization plate provided on the image panel 200. Accordingly, the observer can view the image when looking substantially directly at the barrier panel 300 because a front surface or a plane parallel to the front surface of the barrier panel 300 maintains a normally white property, whereas the observer cannot view the image when looking from the sides because a side surface, i.e., a plane along the inclination direction appears black, thus making it possible to implement the narrow viewing angle.

Figure 3:
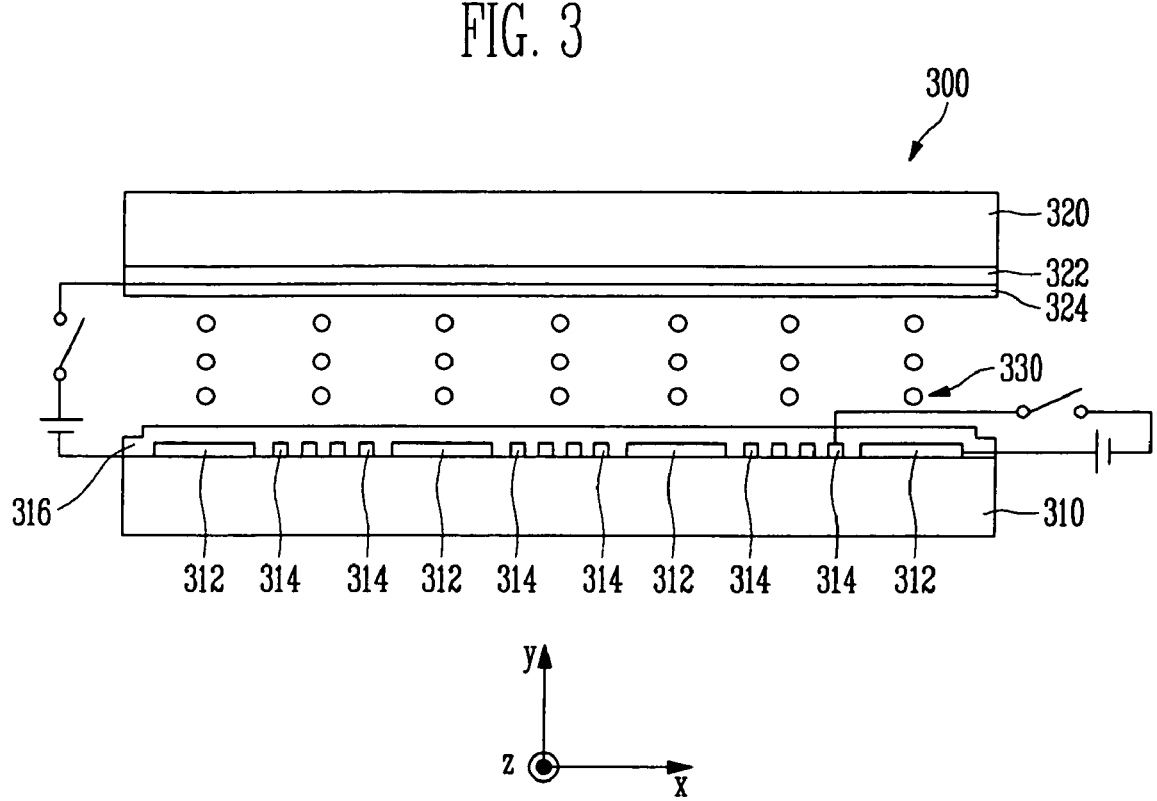
FIG. 3 is a sectional view of a barrier panel of FIG. 2.

FIG. 3 is a sectional view of the barrier panel 300 of FIG. 2.

As described above, the barrier panel 300, located between the image panel 200 and an observer (not shown) serves to pass or screen light. The barrier panel 300 is operated to pass the image from the image panel 200 in case of displaying in the two-dimensional mode, and to cause the observer to perceive a virtual three-dimensional stereo image in case of displaying in the three-dimensional display mode. The barrier panel 300 uses the slits for passing and the barriers for screening the light from the right eye pixel R and left eye pixel L of the image panel 200 to create the perception of a three-dimensional image.

Referring to FIG. 3, the barrier panel 300 provided in the display device of the present invention includes the first substrate 310 having the IPS type electrodes 312, 314 arranged on its inner side surface, the second substrate 320 having the transparent electrode 322 formed on its inner side surface, and the liquid crystal layer 330 formed between the first and second substrates 310, 320.

In addition, the inner sides of the first and second substrates 310, 320 are covered with a first orientation film 316 and a second orientation film 324, respectively. The first and second orientation films 316, 324 are anti-parallel rubbed and the liquid crystals within the liquid crystal layer 330 are initially directed and arranged in the ECB mode.

Figure 4:
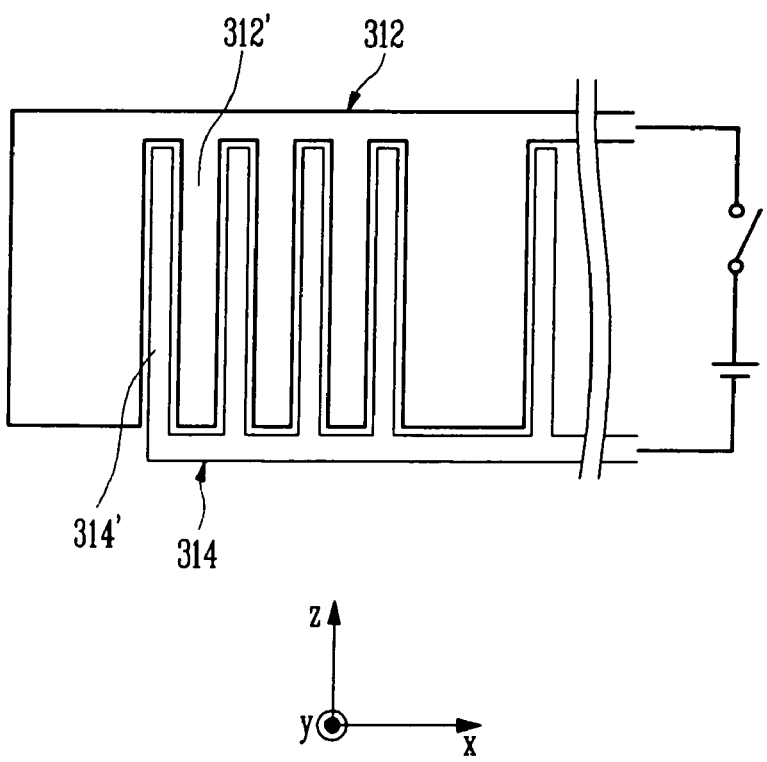
FIG. 4 is a partial plan view illustrating electrodes formed on a first substrate of the barrier panel shown in FIG. 3.

The IPS type electrodes 312, 314 can be configured in various forms. In one embodiment, shown in FIG. 4, a first electrode unit 312 and a second electrode unit 314 are provided along the outer edges of the first substrate 310. Each of the first and second electrode units 312, 314 include a plurality of extrusions 312', 314' that protrude from the edges of the substrate 310 inward. The protrusions 312', 314' may be alternately arranged and the electrode units 312, 314 may be formed as two opposite combs.

If a predetermined voltage is applied between the extrusions 312' of the first electrode unit 312 and the extrusions 314' of the second electrode unit 314, then an electric field is generated substantially parallel to the first substrate 310 (along the x-axis direction of FIG. 3 or FIG. 4) between adjacent extrusions of the first and second electrode units. The liquid crystals in the liquid crystal layer 330 are influenced and tilted by this electric field.

As such, the region where the liquid crystals are tilted by the electric field substantially parallel to the first substrate 310 (x-axis direction) serves as a barrier, whereas the region where the liquid crystals are not tilted because of not being affected by this electric field serves as a slit. The formation of barriers and slits permits the implementation of a three-dimensional display mode. That is, when the barrier panel 300 operates in the three-dimensional display mode, the barrier panel 300 can acquire and demonstrate the same effect as the case that the slits and barriers are alternately formed in a direction substantially parallel to the extrusions 312'. 314' (e.g., along the z-axis direction of the drawings) of the first and second electrode units 312, 314.

Accordingly, the barrier panel 300 can selectively implement a two-dimensional or a three-dimensional display mode depending on whether a predetermined voltage is applied to the IPS type electrodes 312, 314 provided on the first substrate 310 so that an electric field in a direction substantially parallel with the first substrate 310 is generated in a predetermined region.

In addition, the barrier panel 300 according to an embodiment of the present invention can implement a wide viewing angle or a narrow viewing angle in the two-dimensional display mode, depending on whether an electric field between the first and second substrates (along the y-axis direction of the drawings), is formed between the electrodes provided on the first substrate 310 and second substrate 320.

That is, unless the predetermined electric field is formed between the first and second substrates 310, 320 of the barrier panel 300, the penetration axis of the polarization plate provided on the image panel and the longitudinal axis of the array of liquid crystals formed in the liquid crystal layer 330 of the barrier panel are aligned, and thus the wide viewing angle for the two-dimensional display mode is implemented.

In addition, if a predetermined electric field is applied between the first and second substrates 310, 320 of the barrier panel 300, the array of liquid crystals in the liquid crystal layer 330 is tilted toward the direction of the electric field that is substantially perpendicular to the first and second substrates (y-axis direction) by a predetermined angle. Thus an average slope of the liquid crystals in the inclination direction becomes 45 degrees about the penetration axis of the polarization plate provided on the image panel 200. Accordingly, the observer can view the image substantially directly from the front because a front surface or a plane parallel to the front surface maintains a normally white property, whereas the observer cannot view the image from the sides because a side surface, i.e., a plane along the inclination direction appears black, thus making it possible to implement the narrow viewing angle.

Figure 5A:
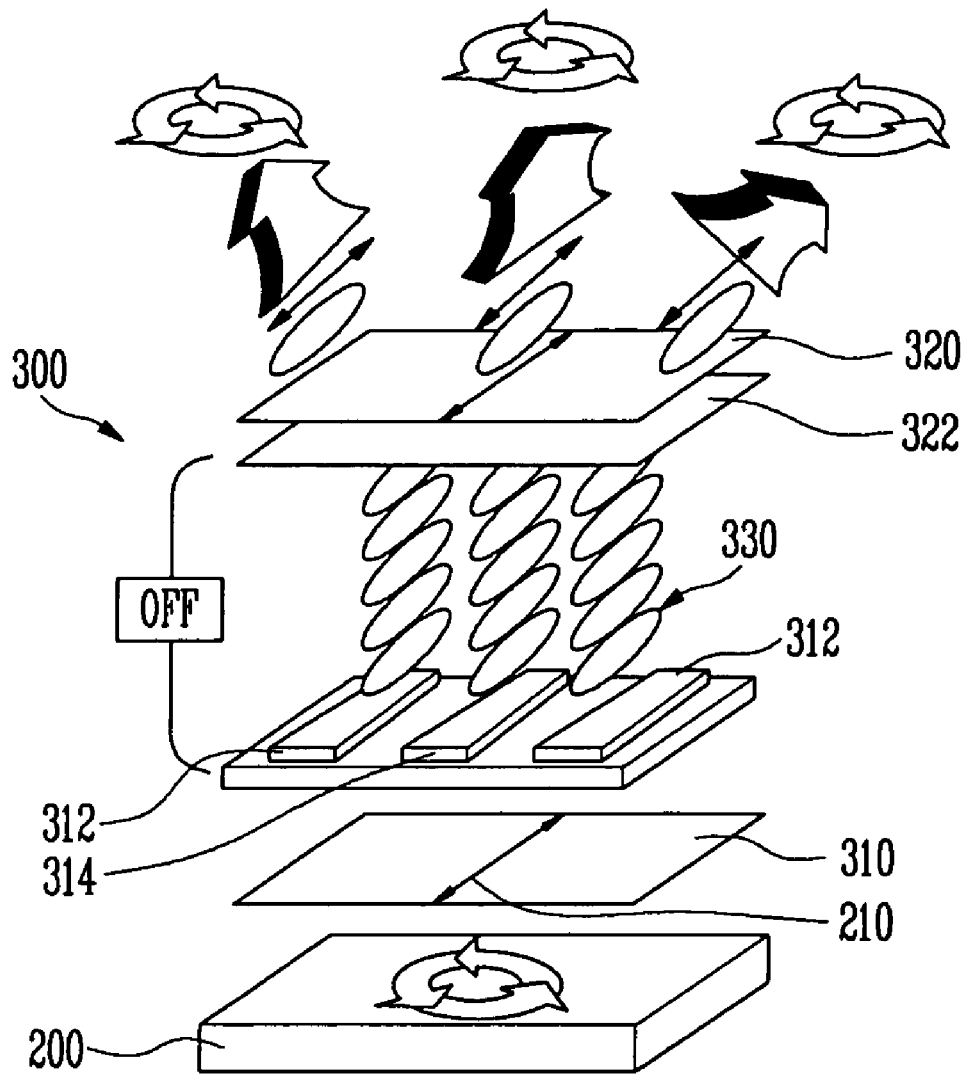
FIGS. 5A, 5B, and 5C are schematic perspective views for illustrating operation of a display device according to an embodiment of the present invention.
Figure 5B:
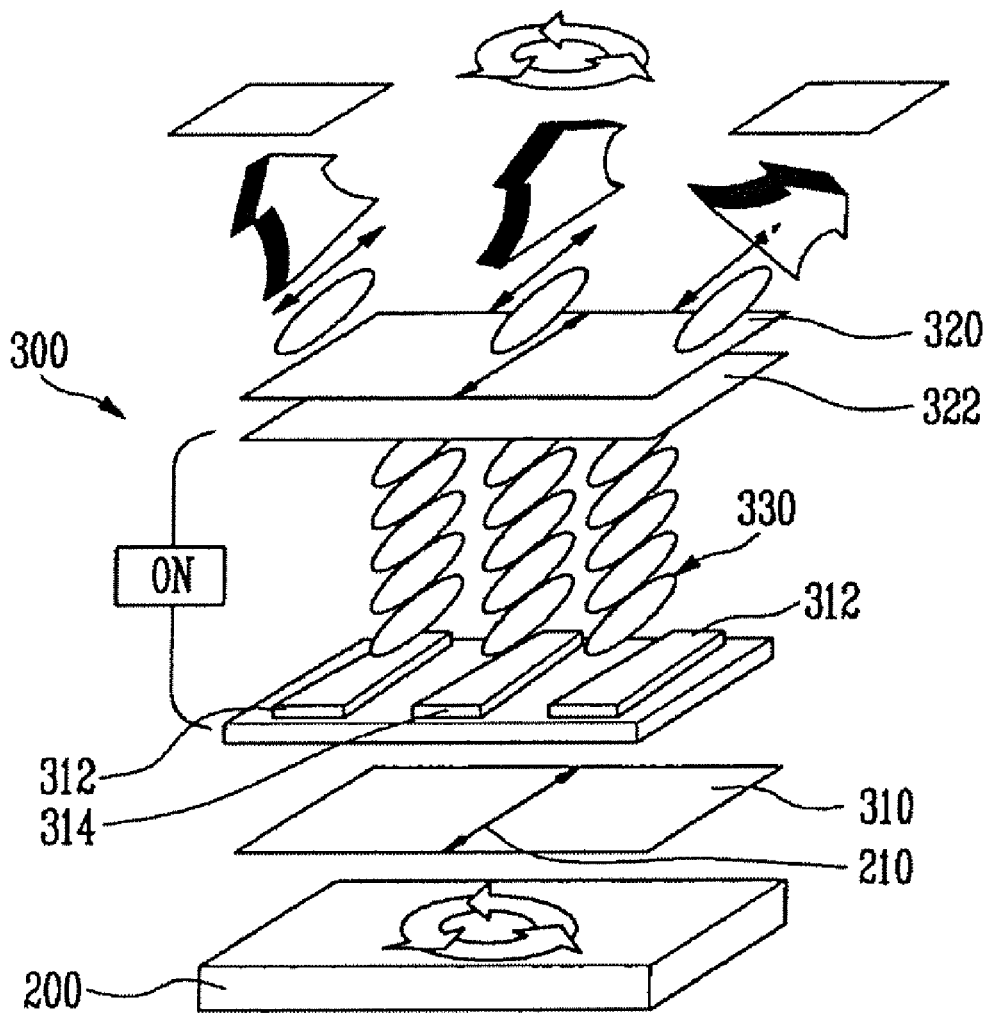
Figure 5C:
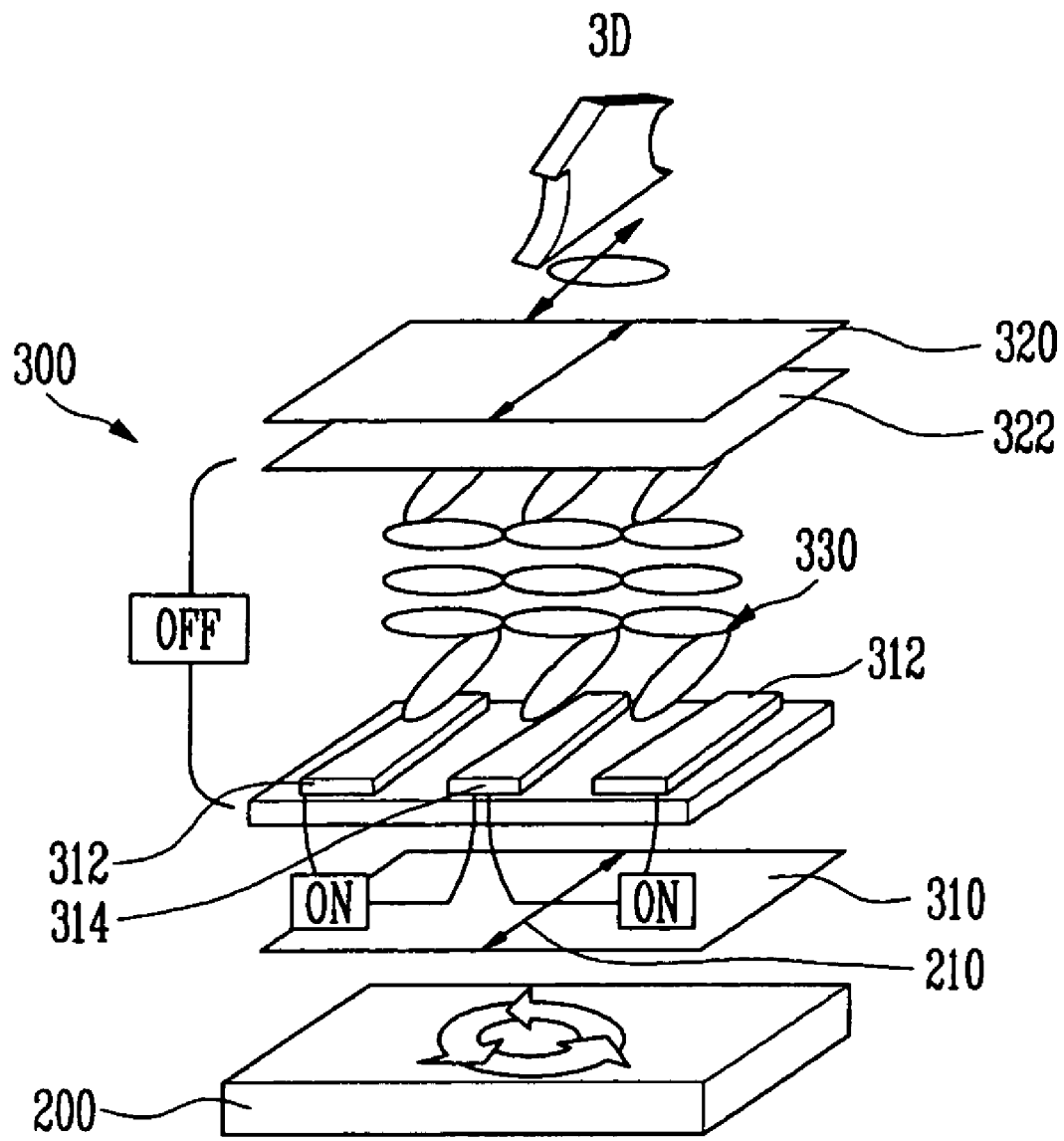

FIGS. 5A, 5B, and 5C are schematic perspective views for illustrating operation of a display device according to an embodiment of the present invention.

FIG. 5A shows a two-dimensional display mode in which a wide viewing angle is implemented. In the mode shown in FIG. 5A, no voltage is applied between the first and second substrates 310, 320 of the barrier panel 300, or between the first electrode unit 312 and the second electrode unit 314 formed on the first substrate 310.

That is, the electric field substantially perpendicular to the substrates (y-axis direction) is not generated between the first and second substrates, and the electric field substantially parallel to the first substrate (x-axis direction) is not generated on the first substrate, either.

Accordingly, because no forces are applied to the liquid crystals in the liquid crystal layer 330 within the barrier panel 300, the liquid crystals maintain their initial orientation state.

Therefore, the penetration axis 210 of the polarization plate provided on the image panel 200 and the longitudinal axis of the array of liquid crystals formed in the barrier panel 300 are aligned (along the z-axis direction of the drawings), and thus the wide viewing angle for the two-dimensional display mode is implemented in FIG. 5A.

FIG. 5B shows a two-dimensional display mode in which a narrow viewing angle is implemented. In the mode shown in FIG. 5B, a predetermined voltage is applied between the first and second substrates 310, 320 of the barrier panel 300, and thus an electric field is generated along the direction substantially perpendicular to the first and second substrates 310, 320 (the y-axis direction of the drawing). No voltage is applied between the first electrode unit 312 and the second electrode unit 314 formed on the first substrate 310, and thus an electric field parallel to the first substrate 310 (in the x-z plane) is not generated.

That is, as the electric field is applied between the first and second substrates, the liquid crystals are tilted toward the direction substantially perpendicular to the substrates (y-axis direction) by a predetermined angle, and thus an average slope of the liquid crystals in the inclination direction becomes 45 degrees about the penetration axis 210 of the polarization plate provided on the image panel 200.

Accordingly, the observer can view the image looking substantially directly at the image panel 200 along the y-axis direction because the front surface or a plane parallel to the front surface of the barrier panel 300 maintains a normally white property, whereas the observer cannot view the image from the sides and at an angle, because the side surfaces, i.e., planes along the inclination direction appear black, thus making it possible to implement the narrow viewing angle.

FIG. 5C shows a three-dimensional display mode. As shown in FIG. 5C, no voltage is applied between the first and second substrates 310, 320 of the barrier panel 300, and thus an electric field is not generated in the direction perpendicular to the substrates. However, a predetermined voltage is applied between the first electrode unit 312 and the second electrode unit 314 formed on the first substrate 310, and thus an electric field is generated in the direction substantially parallel to the first substrate 310 (in the x-axis direction).

That is, the first substrate 310 produces a region where the liquid crystals are tilted in a predetermined interval by the electric field substantially parallel to the first substrate 310 because this electric field is generated on the first substrate 310. Thus, the region where the liquid crystals are tilted by the electric field substantially parallel to the first substrate 310 serves as a barrier, whereas the region where the liquid crystals are not tilted because of not being affected by this electric field serves as a slit. The combination of the barriers and slits permits a three-dimensional display mode to be implemented.

That is, in the case that the barrier panel 300 operates in the three-dimensional display mode, the barrier panel 300 is effectively configured similarly to the case that the slits and barriers are alternately formed in a plane substantially parallel to the substrates 310, 320 along the extrusions 312', 314' (z-axis direction).

Accordingly, the barrier panel 300 can selectively implement a two-dimensional or a three-dimensional display mode depending on whether or not a predetermined voltage is applied to the IPS type electrodes provided on the second substrate and an electric field substantially parallel to the first substrate is generated in a predetermined region.

As mentioned above, according to the present invention, in the two-dimensional display mode, it is possible for a user to choose between a wide viewing angle or a narrow viewing angle, which only allows the user to view the image, depending on the usage place and situation. In addition, the embodiments of the present invention make it possible to switch from a two-dimensional display mode to a three-dimensional display by user's selection.

Although certain exemplary embodiments of the present invention have been shown and described, it would be appreciated by those skilled in the art that changes might be made in this embodiment without departing from the principles and spirit of the invention, the scope of which is defined in the claims and their equivalents.

What is claimed is:
1. A display device comprising:
an image panel for displaying an image; and
a barrier panel located in front of the image panel, the barrier panel being configured to present the image as a two-dimensional image or a three-dimensional image,
wherein the barrier panel comprises:
a first substrate;
in-plane-switching (IPS) electrodes, each located directly on the first substrate;
a second substrate including a transparent electrode located on an inner side surface thereof, the inner side surface of the second substrate facing the first substrate; and
a liquid crystal layer interposed between the first substrate and the second substrate,
wherein the barrier panel is configured to present the two-dimensional image in a two-dimensional display mode with a narrow viewing angle mode if an electric field is generated between the first substrate and the second substrate,
wherein the barrier panel is configured to present the two-dimensional image in the two-dimensional display mode with a wide viewing angle mode if no electric field is generated between the first substrate and the second substrate and no voltage is applied, and no electric field is generated, between the IPS electrodes arranged on the first substrate, and
wherein the barrier panel is configured to present the three-dimensional image in a three-dimensional display mode if no voltage is applied between IPS electrodes on the first substrate and the transparent electrode on the second substrate, and a predetermined voltage is applied between the IPS electrodes and an electric field substantially parallel to the first substrate is generated in a predetermined region.

2. The display device as claimed in claim 1, wherein first and second orientation films are provided on inner sides of the first and second substrates, respectively, the inner side of the first substrate facing the second substrate and the inner side of the second substrate facing the first substrate.

3. The display device as claimed in claim 2, wherein the first and second orientation films are anti-parallel rubbed for arranging liquid crystal in the liquid crystal layer in an electrically controlled birefringence (ECB) mode.

4. The display device as claimed in claim 1, wherein the IPS electrodes form a first electrode unit and a second electrode unit each having a plurality of extrusions, the extrusions of each electrode unit arranged alternately with the extrusions of the other electrode unit.

5. The display device as claimed in claim 1, wherein the image panel is a liquid crystal display, a plasma display panel, or an organic light-emitting device.

6. The display device as claimed in claim 1, wherein when the image panel displays the three-dimensional image, a left eye pixel of an image for a left eye, and a right eye pixel of an image for a right eye are alternately arranged.

7. A barrier panel configured to present a two-dimensional image or a three-dimensional image from an image panel, the barrier panel comprising:
a first substrate;
in-plane-switching (IPS) electrodes, each located directly on the first substrate;
a second substrate including a transparent electrode located on an inner side surface thereof, the inner side surface of the second substrate facing the first substrate; and
a liquid crystal layer interposed between the first substrate and the second substrate,
wherein the two-dimensional image is presented in a two-dimensional display mode if no voltage is applied, and no electric field is generated, between the IPS electrodes,
wherein the two-dimensional image is presented in the two-dimensional display mode with a narrow viewing angle if an electric field is generated between the first substrate and the second substrate,
wherein the two-dimensional image is presented in the two-dimensional display mode with a wide viewing angle if no electric field is generated between the first substrate and the second substrate, and
wherein the barrier panel is configured to present the three-dimensional image in a three-dimensional display mode if no voltage is applied between IPS electrodes on the first substrate and the transparent electrode on the second substrate, and a predetermined voltage is applied between the IPS electrodes and an electric field substantially parallel to the first substrate is generated in a predetermined region.

8. The barrier panel of claim 7, further comprising:
a first orientation film located on the IPS electrodes; and
a second orientation film located on the transparent electrode,
wherein the first orientation film and the second orientation film are anti-parallel rubbed for arranging the liquid crystals in an electrically controlled birefringence (ECB) mode.

9. The barrier panel of claim 7,
wherein the IPS electrodes form a comb-shaped first electrode unit and a comb-shaped second electrode unit having interlaced extrusions, and
wherein the electric field generated between the IPS electrodes is an electric field substantially parallel to the first substrate generated between the extrusions of the first electrode unit and the extrusions of the second electrode unit.

10. The display device as claimed in claim 1, wherein each of the IPS electrodes comprises a same vertical position, wherein the vertical position is a position of the IPS electrode in the direction of a line extending normal to the first substrate.

11. The display device as claimed in claim 1, wherein each of the IPS electrodes comprises a same width, wherein the width is a measurement of a thickness of the IPS electrode extending in a direction of a line normal to the first substrate.

12. The display device as claimed in claim 1, wherein when the barrier panel is presenting the three-dimensional image, the liquid crystal layer comprises:
a first region of liquid crystals tilted at a first angle; and
a second region of liquid crystals tilted at a second angle different from the first angle.

13. The display device as claimed in claim 1, wherein when the barrier panel is presenting the three-dimensional image, no electric field is generated between the first substrate and the second substrate in a direction perpendicular to the first substrate.

14. The display device as claimed in claim 1, wherein when the barrier panel is presenting the three-dimensional image, an IPS electric field is generated between a first IPS electrode and a second IPS electrode of the IPS electrodes, wherein the IPS electric field extends from the first IPS electrode to the second IPS electrode.

* * * * *